United States Patent [19]

Nishida et al.

[11] Patent Number: 4,743,276
[45] Date of Patent: May 10, 1988

[54] METHOD OF SEPARATING CARBON MONOXIDE AND CARBON MONOXIDE ADSORBENT USED IN THIS METHOD

[75] Inventors: Taisuke Nishida, Tokyo; Kazuo Tajima, Hiratsuka; Yo Osada; Osamu Shigyo, both of Yokohama; Hiroaki Taniguchi, Kuki, all of Japan

[73] Assignee: Nippon Kokan Kabushiki Kaisha, Tokyo, Japan

[21] Appl. No.: 948,394

[22] Filed: Dec. 31, 1986

Related U.S. Application Data

[63] Continuation of Ser. No. 751,038, Jul. 1, 1985, abandoned.

[30] Foreign Application Priority Data

| Jul. 4, 1984 [JP] | Japan | 59-138771 |
| Jul. 4, 1984 [JP] | Japan | 59-138772 |
| Apr. 8, 1985 [JP] | Japan | 60-72696 |
| Apr. 8, 1985 [JP] | Japan | 60-72697 |

[51] Int. Cl.⁴ ............................................. B01D 53/04
[52] U.S. Cl. ............................................. 55/68; 55/75
[58] Field of Search ............ 55/68, 75, 389; 423/246, 247, 415 A; 502/75, 77–79, 406, 407

[56] References Cited

U.S. PATENT DOCUMENTS

| 3,013,982 | 12/1961 | Breck et al. | 502/75 X |
| 3,185,540 | 5/1965 | Breck et al. | 423/247 |
| 3,331,190 | 7/1967 | Glew et al. | 55/75 X |
| 3,407,039 | 10/1968 | Bryant | 502/78 X |
| 3,476,508 | 11/1969 | Kearby et al. | 423/247 X |
| 3,497,462 | 2/1970 | Kruerke | 502/75 |
| 3,755,540 | 8/1973 | Rasback | 502/75 X |
| 3,789,106 | 1/1974 | Hay | 55/68 X |
| 4,019,879 | 4/1977 | Rabo et al. | 55/68 |
| 4,019,880 | 4/1977 | Rabo et al. | 55/75 X |
| 4,180,693 | 12/1979 | Marcilly | 502/78 X |
| 4,297,328 | 10/1981 | Ritscher et al. | 423/247 X |
| 4,358,297 | 11/1982 | Eberly, Jr. | 55/75 X |
| 4,470,829 | 9/1984 | Hirai et al. | 55/68 |
| 4,539,020 | 9/1985 | Sakuraya et al. | 55/68 X |

FOREIGN PATENT DOCUMENTS

| 18700 | 11/1980 | European Pat. Off. | 423/415 A |
| 1512263 | 12/1967 | France. | |
| 2335258 | 7/1977 | France. | |
| 7255 | 1/1982 | Japan | 423/415 A |
| 58-156517 | 9/1983 | Japan. | |
| 59-22625 | 2/1984 | Japan. | |
| 59-26121 | 2/1984 | Japan. | |
| 662460 | 12/1951 | United Kingdom | 423/247 |

*Primary Examiner*—Robert Spitzer
*Attorney, Agent, or Firm*—Frishauf, Holtz, Goodman & Woodward

[57] ABSTRACT

In a method of the invention for selectively adsorbing CO in a gas mixture containing at least CO and $CO_2$ with an adsorbent and desorbing the adsorbed CO, the adsorbent carries one metal or a mixture of metals selected from Ni, Mn, Rh, Cu(I) and Ag, and an adsorption temperature is set to be 50° to 250° C. to allow a single-step treatment.

11 Claims, 7 Drawing Sheets

METHOD OF SEPARATING CARBON MONOXIDE AND CARBON MONOXIDE ADSORBENT USED IN THIS METHOD

This application is a continuation, of application Ser. No. 751,038, filed July 1, 1985, now abandoned.

BACKGROUND OF THE INVENTION

1. Field of the Invention

The present invention relates to a method of selectively adsorbing CO in a gas mixture containing at least CO and $CO_2$ with an adsorbent and separating the adsorbed CO.

2. Description of the Prior Art

The gas mixture as mentioned above includes natural gases, modified gases such as naphtha, gasified gases of coal, coke or heavy oil, gases byproduced in iron and steel works, especially shaft furnace gas and converter gas, and gases byproduced at oil refineries or petrochemical plants.

As a method for separating, concentrating or removing CO from such a gas mixture and for manufacturing an industrially usable gas, the pressure swing adsorption method (to be referred to as the PSA method hereinafter) using a solid adsorbent is known. In the PSA method, after an adsorbing component is adsorbed in an adsorbent under a pressure of normally 1 to 5 kg/cm$^2$.G, the adsorbed component is desorbed from the adsorbent at a reduced pressure of 20 to 100 Torr. A gas booster is arranged at a location upstream from the location for performing this process.

Currently used adsorbents generally have a larger affinity for $CO_2$ than for CO and require some pretreatment in order to separate CO from a gas mixture containing $CO_2$. For example, in the technique disclosed in Japanese Patent Disclosure No. 59-22625, the PSA method consists of two steps of a pretreatment for removing water and $CO_2$ and a PSA step for adsorbing CO. In a technique disclosed in Japanese Patent Disclosure No. 59-26121 for separating CO from a converter gas, mordenite is used as an adsorbent and the PSA method also consists of a PSA step of adsorbing-/separating $CO_2$ and a PSA step of adsorbing/separating CO.

However, such a two-step method requires a bulky apparatus and complex procedures.

The use of activated carbon, silica gel, activated alumina or zeolite as an adsorbent is being studied. For example, Japanese Patent Disclosure No. 58-156517 discloses a solid adsorbent consisting of halogenated Cu(I) and activated carbon as a CO adsorbent. However, no report is available which discloses that this solid adsorbent exhibits a stable, acceptable performance over a long period of time. U.S. Pat. No. 4,019,879 discloses an adsorbent consisting of a zeolite having a silica to alumina ratio as high as 20 to 200 and carrying Cu(I) thereon. However, in a zeolite having such a high silica to alumina ratio, the number of ion-exchangeable cations is generally considered to decrease. This means that the CO adsorption capacity per unit weight of the adsorbent is decreased.

SUMMARY OF THE INVENTION

It is a first object of the present invention to provide a method of adsorbing CO in a gas mixture containing $CO_2$ and CO using an adsorbent and thereafter separating the adsorbed CO by single-step adsorption/separation.

It is a second object of the present invention to provide a method of recovering highly pure CO with a high recovery rate.

It is a third object of the present invention to provide a method of providing an adsorbent having a carrier suitable for achieving the first and second objects.

It is a fourth object of the present invention to provide a method of boosting an adsorption temperature to a predetermined temperature efficiently and economically when CO in a gas mixture is adsorbed by an adsorbent.

In order to achieve the first object of the present invention according to the present invention, an adsorbent carries one metal or a mixture of metals selected from Ni, Mn, Rh, Cu(I) and Ag, and the adsorption temperature for adsorbing CO in the gas mixture is set to be 50° to 250° C. With this method, the CO adsorption amount is larger than the $CO_2$ adsorption amount, and with a single-step PSA treatment, CO can be adsorbed and separated.

In order to achieve the second object of the present invention, the adsorption temperature for adsorbing CO is set to fall within a range of 150° to 250° C. With this method, the ratio of CO adsorption amount to adsorption amounts of other components (i.e., $CO/CO_2$, $CO/N_2$) is improved, so that highly pure CO can be recovered with a high recovery rate.

In order to achieve the third object of the present invention, an adsorbent consists of a zeolite carrier having a silica/alumina ratio of 10 or less and an effective pore diameter of 0.38 nm (3.8 Å) or more capable of adsorbing CO, and one metal or a mixture of metals selected from Ni, Mn, Rh, Cu(I) and Ag. The adsorbent has a high $CO/N_2$ adsorption ratio ($vCO/vN_2$) and has an excellent adsorption performance.

In order to achieve the fourth object of the present invention, the gas mixture is adiabatically compressed at a pressure of 0.5 kg/cm$^2$.G to 7 kg/cm$^2$.G to increase the gas mixture temperature so as to set the gas mixture at an adsorption temperature. With this method, the gas mixture can be efficiently and economically heated without requiring a heater or the like.

DETAILED DESCRIPTION OF THE PREFERRED EMBODIMENTS

The present inventors studied on a method of separating, concentrating and eliminating CO from a gas mixture containing $CO_2$ by a single-step. As a result of such studies, the present inventors found that when an adsorbent having a metal or a mixture of metals selected from Ni, Mn, Rh, Cu(I) and Ag is carried on a carrier, although the $CO_2$ adsorption amount is several times that of the CO adsorption amount at ambient temperature, the adsorption equilibrium amounts of CO and $CO_2$ are reversed when the adsorption temperature is increased. More specifically, the rate of decrease in the adsorption equilibrium amount of CO securely fixed to an adsorbent as a function of temperature increase is very small. However, in contrast to this, the rate of decrease for $CO_2$ is large.

This finding is surprising from the general theory according to which a CO adsorption amount is decreased at high temperatures and CO adsorption/separation is therefore preferably to be performed at ambient temperature.

Figure 1:
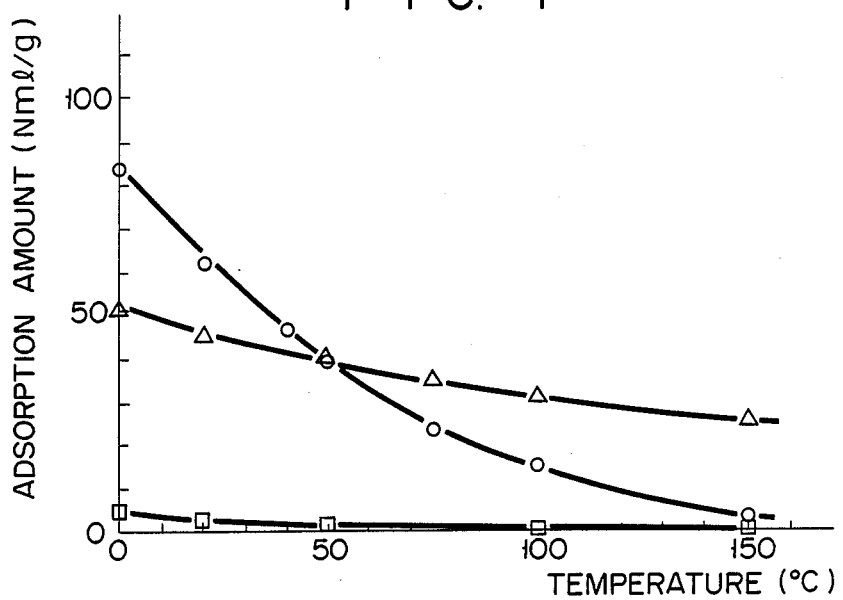
FIG. 1 is a graph showing the CO and $CO_2$ adsorption amounts as a function of adsorbent temperature when a Cu(I)-Y adsorbent is used.

This mechanism will be described in more detail. FIG. 1 is a graph showing the CO and $CO_2$ adsorption amounts when Cu(I)-Y is used as an adsorbent. The graph reveals that as the temperature is increased, the $CO_2$ adsorption amount is abruptly decreased while the CO adsorption amount is only slightly decreased. When the adsorption temperature reaches about 50° C., the CO and $CO_2$ adsorption amounts become substantially equal to each other. When the adsorption temperature reaches 100° C., the $CO_2$ adsorption amount is decreased to about ½ the CO adsorption amount. At 150° C., the $CO_2$ adsorption amount is nearly zero. Therefore, when this adsorbent is used, when a gas mixture containing at least CO, $CO_2$ and/or $N_2$ is treated by the PSA method at an operation temperature of 50° C. or higher, CO can be separated, concentrated and removed by a single step.

However, when the adsorption temperature is increased above 250° C., the following problems are encountered:

(1) The CO adsorption amount is also decreased, and the amount of adsorbent required per unit amount of gas to be treated is increased.

(2) Energy required for heating the adsorption tower and/or gas to be treated is increased.

(3) The material for an electromagnetic valve or the like of a PSA apparatus is expensive in view of required heat resistance and the like.

(4) Subreactions such as $H_2$-CO and $H_2O$-CO occur. For such reasons, the adsorption temperature must not exceed 250° C.

For the reasons described above, according to the present invention, the temperature range for performing CO adsorption is set to be 50° to 250° C. In this case, if the purity and recovery rate of recovered CO are not particularly at issue, the adsorption temperature can fall within the range of 50° to 150° C. However, in order to recover highly pure CO at a high recovery rate, the adsorption temperature range is preferably set to be 150° to 250° C.

Within the temperature range prescribed above, the CO and $CO_2$ adsorption equilibrium characteristics are as follows. As compared to the case wherein the adsorption temperature falls outside this range, the CO adsorption equilibrium amount decreases although only slightly. This means an increase in the amount of adsorbent required for treating a unit amount of gas and is not a desirable condition.

However, the $CO_2$ and $N_2$ adsorption equilibrium amounts are quite difficult to decrease abruptly as compared to the CO adsorption equilibrium amount. For this reason, the $CO/CO_2$ adsorption ratio and the $CO/N_2$ adsorption ratio can be set to be very large and the selective CO adsorption performance of an adsorbent can be increased considerably.

In addition, since the method of the present invention is performed at a high temperature, when an impurity gas between adsorbent particles in recovered CO gas or an impurity gas which is co-adsorbed is purged, the purge step can be performed within a short period of time and with a high efficiency. When the recovered CO is vacuum-exhausted and desorbed, the process can be performed within a short period of time.

As a carrier for an adsorbent to be used in a CO adsorption method according to the present invention, a zeolite having a silica/alumina ratio of 10 or less and effective pore diameter of 0.38 nm (3.8 Å) capable of adsorbing CO is preferably used. Examples of a zeolite carrier may include Y-type zeolite ($Na_2O.Al_2O_34.8SiO_2.8.9H_2O$), A-type zeolite ($Na_2O.Al_2O_3.2SiO_2.4.5H_2O$), mordenite ($Na_2O.Al_2O.Al_2O_3.9\text{-}10SiO_2.6H_2O$), X-type zeolite ($Na_2O.Al_2O_3.2.5SiO_2.6H_2O$), L-type clinoptilolite, Ω-type clinoptilolite, erionite, faujasite, ZK-4, ZSM-2, ZSM-3, ZSM-4 and ZSM-10. A zeolite carrier can be a natural or synthetic zeolite.

An adsorbent using such a zeolite carrier has a high $CO/N_2$ adsorption ratio ($vCO/vN_2$). For example, NiY, MnY and RhY have high $CO/N_2$ adsorption ratios ($vCO/vN_2$) of about 2.5 or more, and Cu(I)-Y, AgY and AgX have extremely high $CO/N_2$ adsorption ratios of about 6 or more. The reason for this is surmised to be as follows. When a selected carrier contains Ni, Mn or Rh, the carried cations cause a change in pore diameter of the zeolite to allow easier adsorption of CO than $N_2$. Cu(I) and Ag cations which are transition element copper group elements and have a valency of 1 have a good affinity for CO. A synergetic effect of these two effects is also plausible.

An adsorbent using a metal having a strong reducing property, e.g., AgY, is suitable for use in separating CO from a gas mixture which does not contain hydrogen, according to experiments conducted by the present inventors. Among the zeolites enumerated above, AgY (75% ion-exchanged) was used to perform 6 adsorption/ desorption cycles of a standard gas having a composition (74% CO, 9% $CO_2$, 3% $H_2$ and the balance of $N_2$) substantially the same as that of a converter gas. The amount of CO adsorbed by this adsorbent at 20° C. and the ambient pressure was decreased from 52.3 ml/g of the first cycle to 41.7 ml/g, i.e., by 20%. This is attributed to the fact that silver ions are reduced to metal silver by hydrogen although at ambient temperature.

The metal carrying method need not be the ion-exchange method but can be the impregnation method. According to an impregnation method, a zeolite is immersed in a solution of a predetermined metal salt under agitation, and the solution is evaporated to provide a solid material. (Takaho Shirazaki & Naoyuki Todo, ed., "Shokubai Chosei (Catalyst Adjustment)", Kodansha Scientific, pp. 330 to 337, 1974)

When an adsorbent of the present invention is prepared by reducing a Cu(II) zeolite into a Cu(I) zeolite, $H_2$, CO, $NH_3$, or $CH_4$ gas can be used as a reducing gas at predetermined temperature and pressure. In order to carry 1-valency copper on Na zeolite, Cu(I) is dissolved in liquid ammonia and ion-exchange is performed.

According to the present invention, in order to achieve a present adsorption temperature of 50° to 250° C., the gas mixture is adiabatically compressed by a gas booster within a pressure range of 0.5 to 7 kg/cm$^2$.G to obtain a good effect.

In a conventional PSA treatment at ambient temperature, the boosting or compression degree is set independently of an adsorption temperature, and heat corresponding to the temperature increase by adiabatic compression is exhausted outside the reaction system. In contrast to this, according to the present invention, the boosting degree is set in relation to an adsorption treatment temperature of a gas mixture with an adsorbent, and the resultant temperature increase upon boosting is utilized.

This method will be described with reference to a case wherein a converter gas of an iron and steel work is a gas mixture to be treated.

A converter gas generally has the following composition:

| | |
|---|---|
| CO | 60–80% |
| $CO_2$ | 10–20% |
| $H_2$ | 0.5–2% |
| $O_2$ | tr–0.1% |
| $N_2$ | 5–20% |
| Water | 40–80° C. saturation amount |

Figure 10:
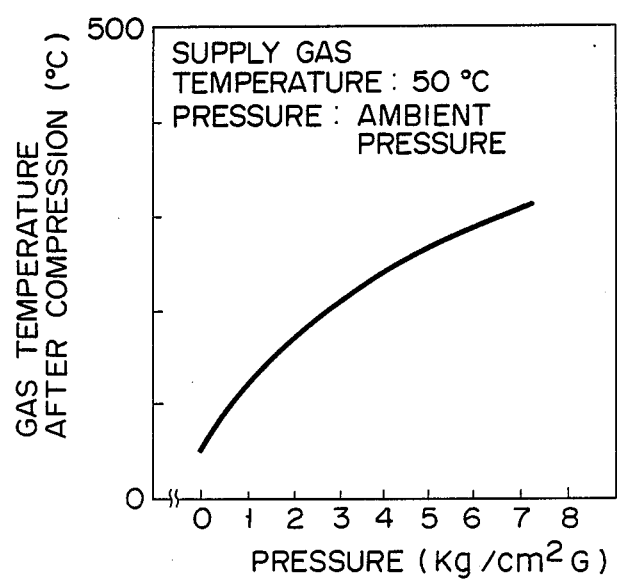
FIG. 10 is a graph showing the gas temperature after boosting as a function of gas temperature when a gas is adiabatically compressed.

When the supply gas temperature is assumed to be 50° C., the converter gas temperature is increased by a booster, as shown in FIG. 10.

Figure 7:
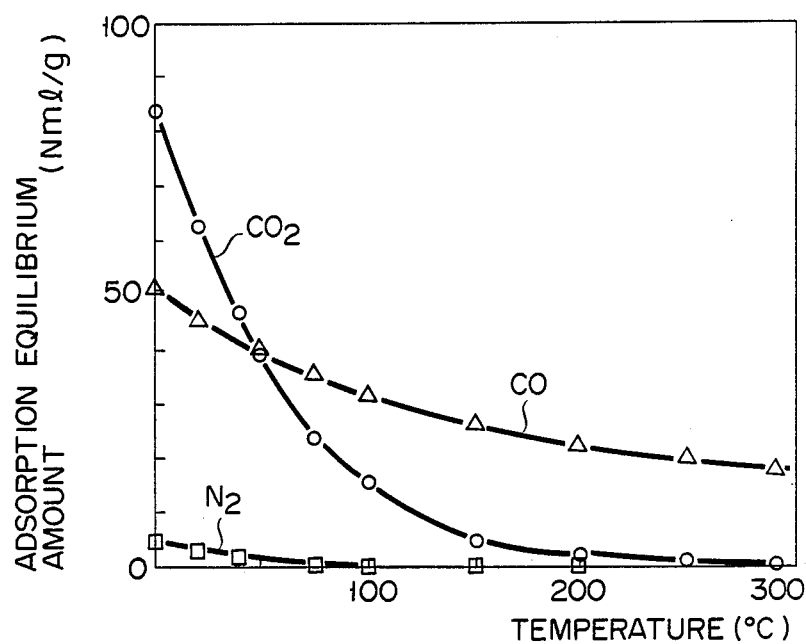
FIG. 7 is a graph showing the CO, $CO_2$ and $N_2$ adsorption amounts as a function of adsorbent temperature when a Cu(I)-Y adsorbent is used.

As shown in FIG. 7, the CO adsorption amount by the adsorbent only slightly decreases with an increase in temperature. In contrast to this, the $CO_2$ adsorption amount abruptly decreases, thus increasing the CO/$CO_2$ ratio. When only this factor is considered, the separation performance of CO and $CO_2$ is increased with an increase in temperature. However, when the temperature is increased, the CO adsorption amount itself is decreased, resulting in a bulky adsorption tower. Moreover, excessive heating is not desirable when considered from the viewpoint of the apparatus since the material of an electromagnetic valve or the like is expensive and sub-reactions of $H_2$-CO and $H_2O$-CO are caused.

Figure 11:
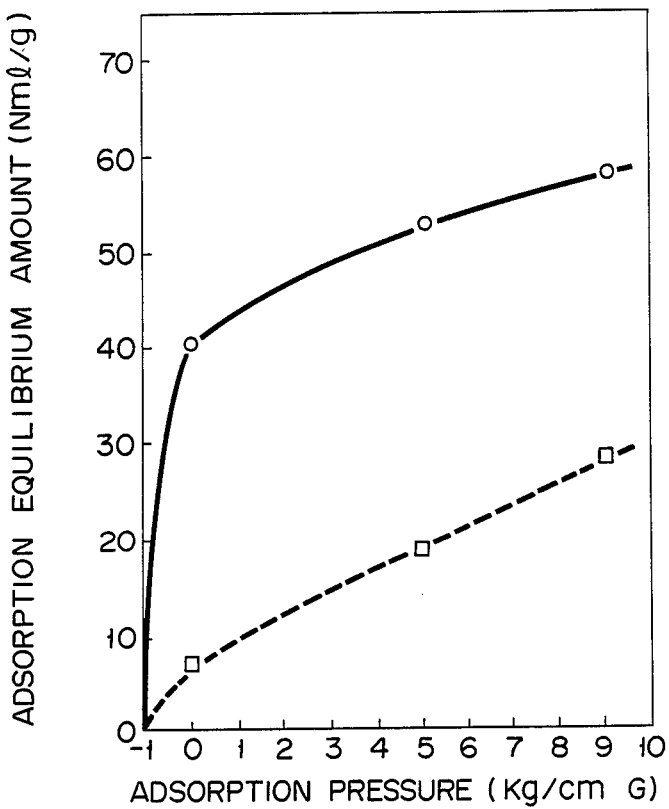
FIG. 11 is a graph showing the CO and $N_2$ adsorption equilibrium amounts of an adsorbent as a function of adsorption pressure.
Figure 12:
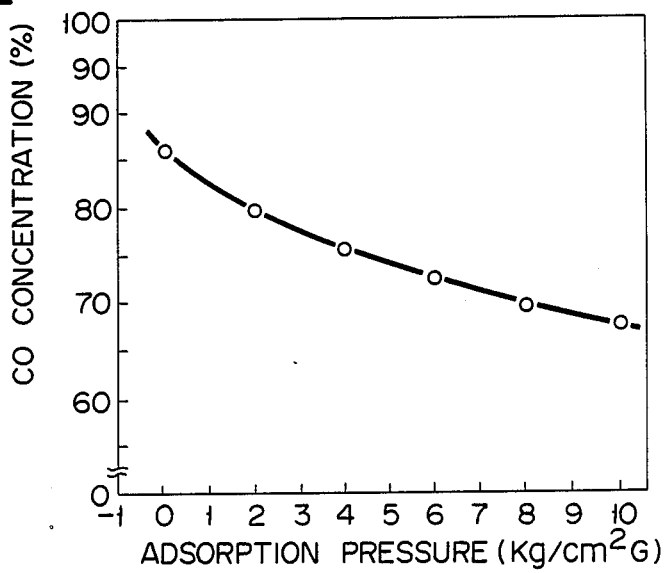
FIG. 12 is a graph showing the recovered CO concentration as a function of adsorption pressure.

When the pressure is considered, as shown in FIG. 11, as the pressure is increased, the CO adsorption equilibrium amount is increased. However, with an increase in pressure, the $N_2$ adsorption equilibrium amount is also increased. This means that the adsorption tower is rendered compact if the pressure is increased. The CO and $N_2$ adsorption equilibrium amounts were calculated. In this calculation, a gas mixture of CO/$N_2$=1 is introduced into an adsorption tower. After an adsorption equilibrium is established, CO is desorbed and the desorbed CO concentration at each adsorption pressure is plotted. The obtained results are shown in FIG. 12. The graph of FIG. 12 reveals that the CO concentration decreases with an increase in pressure.

In practice, however, the CO partial pressure is much larger than that of the $N_2$ partial pressure in the gas mixture. For this reason, the CO purity is assumed to be much better than that shown in FIG. 12. In addition, since a purge step is normally performed, a desired purity increase can be achieved. However, if the pressure is increased too much, the purge gas amount for improving the gas purity is increased, and the CO recovery rate is decreased.

In consideration of the analysis results of temperature and pressure in relation to the adsorption characteristics and heat loss in an actual apparatus, the compression pressure in the present invention is 0.5 to 7 kg/cm$^2$.G and preferably 0.5 to 5 kg/cm$^2$.G.

Figure 13:
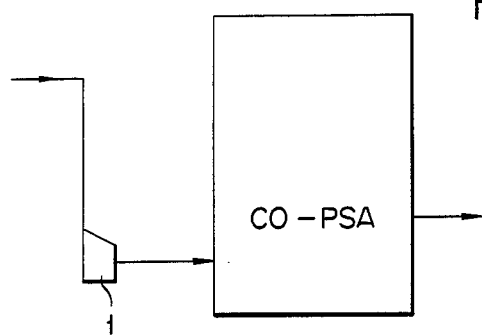
FIGS. 13 and 14 are diagrams showing different apparatuses for practising the method according to the present invention.

According to the method of the present invention, even if the supply gas contains a saturation amount of water at the selected adsorption temperature, the water content will not condense since the gas is heated by a booster. Therefore, if an adsorbent not subject to an influence of water content is used, a PSA treatment of CO can be performed by a simple process using only a gas booster 1 as shown in FIG. 13. In this case, the pressure of the booster can be fixed at a predetermined value within the prescribed range, or the adsorption temperature can be kept constant.

Figure 14:
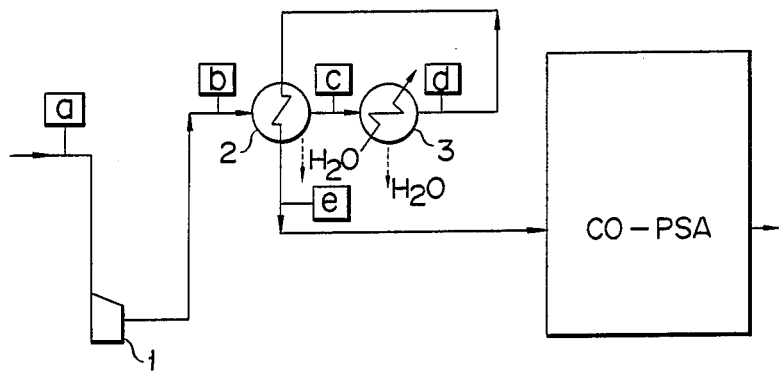

However, if an adsorbent is of a type easily susceptible to an influence of water content, as shown in FIG. 14, a heat exchanger 2 and a cooling unit 3 can be included after a booster 1. In this case, the saturation water content at ambient temperature is cooled by the heat exchanger 2 under pressure to provide an extremely good desorption effect, and the power required to drive the cooling unit 3 is reduced to a minimum.

Assume a case wherein the supply gas is supplied in the amount (rate) of 1 kg/Hr, water in an amount to saturate at 50° C. is added to provide a humid gas, and the gas is boosted to a pressure of 3 kg/cm$^2$.G. When the material exchanges in the flow shown in FIG. 14 are calculated, the results as shown in Table 1 below are obtained. It can be seen from these results that the water removal effect obtainable with a heat exchanger is substantial.

TABLE 1

| Measuring point | a | b | c | d | e |
|---|---|---|---|---|---|
| Gas pressure kg/cm$^2$ · G | 0 | 3 | 3 | 3 | 3 |
| Gas temperature °C. | 50 | 270 | 40 | 10 | 196 |
| Dry base gas amount kg/Hr | 1 | 1 | 1 | 1 | 1 |
| Gas water content kg/Hr | 0.083 | 0.083 | 0.011 | 0.002 | 0.002 |
| Condensed water | — | — | 0.072 | 0.009 | — |

TABLE 1-continued

| Measuring point | a | b | c | d | e |
|---|---|---|---|---|---|
| amount kg/Hr | | | | | |
| Total dehydration rate % | | | 86.6 | 97.7 | |

In this manner, according to the method of setting the high-temperature PSA treatment adsorption temperature by setting and/or controlling the pressure of a booster, only a booster is basically required. Thus, a cooling unit and/or a water-cooled cooler normally used in a conventional PSA process performed at ambient pressure is not required, resulting in a very simple and economical process.

The present invention will now be described by way of its Examples.

EXAMPLE 1

CO, $CO_2$ and $N_2$ Adsorption Characteristics of Cu(I)-Y Adsorbent of Present Invention and NaY Adsorbent of Comparative Example as a Function of Temperature A 0.5N solution of $CuCl_2$ was prepared. Ten grams of NaY zeolite and 50 ml of the 0.5N solution were charged into a 100 ml round flask. After mounting a condenser on the round flask, heat refluxing was performed at 100° C. by a mantle heater for 2 hours. After the flask was left to stand, the supernatant was recovered by decantation. Another 50 ml of the 0.5N solution were added and similar refluxing was performed. The refluxing was performed a total of three times. The zeolite was washed well with pure water, dried at 110° C., pulverized, and baked in an electric furnace at 450° C. for 2 hours to prepare an adsorbent. The recovered supernatant and the filtrate were mixed and the mixture was subjected to flame analysis to determine the amount of released Na and the ion-exchange rate. The obtained Cu(II)-Y zeolite was reduced in a hydrogen atmosphere at 180° C. for 30 minutes to provide Cu(I)-Y.

Two grams of the adsorbent prepared in this manner were charged into a 20 ml sample bottle which was set on a constant-pressure type adsorption amount measuring apparatus. Dehydration was performed by heating at 150° C. in a vacuum of $10^{-3}$ mmHg for 1 hour.

The sample bottle was set in a thermostat and was left to stand for 20 to 30 minutes. While the bottle was kept at the measuring temperature, He gas (purity of 99.9% up) was fed in order to measure the adsorption amount up to a saturation adsorption amount and to determine the dead volume. The measuring temperature was sequentially increased within a range of about 0° to about 150° C. after measuring the saturation adsorption amount at each set temperature. After the measurement, desorption by heating at 150° C. at a pressure of $10^{-3}$ mmHg was performed and the adsorbent was left to naturally cool. The adsorption amount was measured using the measurement gas and following the same procedures as described above. After completing measurements at all gas temperatures, the adsorption amount was measured. The CO and $CO_2$ saturation adsorption amounts per unit weight of the adsorbent were determined in accordance with the obtained measurement.

FIG. 1 shows the obtained results. It can be seen from FIG. 1 that the adsorption equilibrium amounts of $CO_2$ and CO are reversed at 50° C.

Based on these results, when a gas mixture containing at least CO, $CO_2$ and/or $N_2$ is treated at 50° to 150° C. by the PSA method and using this adsorbent, separation, concentration and removal of CO can be performed by a single-step method.

Figure 2:
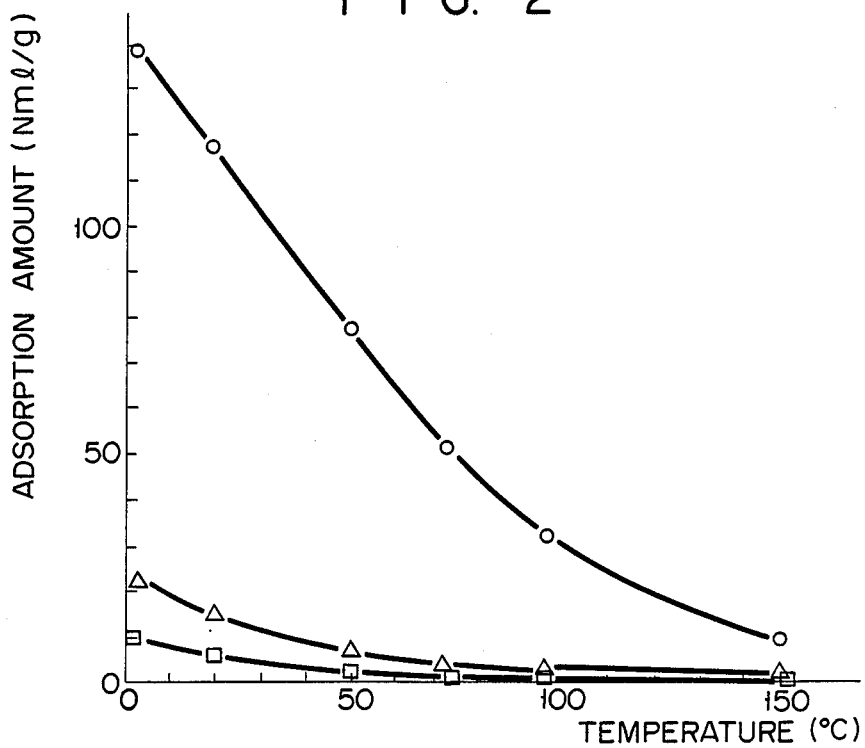
FIG. 2 is a graph showing the CO and $CO_2$ adsorption amounts as a function of adsorbent temperature when an NaY adsorbent is used.

As a Comparative Example, NaY which was not subjected to ion-exchange with a metal was used as an adsorbent, and the saturation adsorption amounts was determined in accordance with the same method as described above. The obtained results are shown in FIG. 2. In this case, the $CO_2$ and CO adsorption equilibrium amounts were not reversed. This means that the reversal of the adsorption amounts as shown in FIG. 1 is a phenomenon occurring uniquely in an adsorbent in which a specific transition element is carried on a zeolite.

EXAMPLE 2

Figure 3:
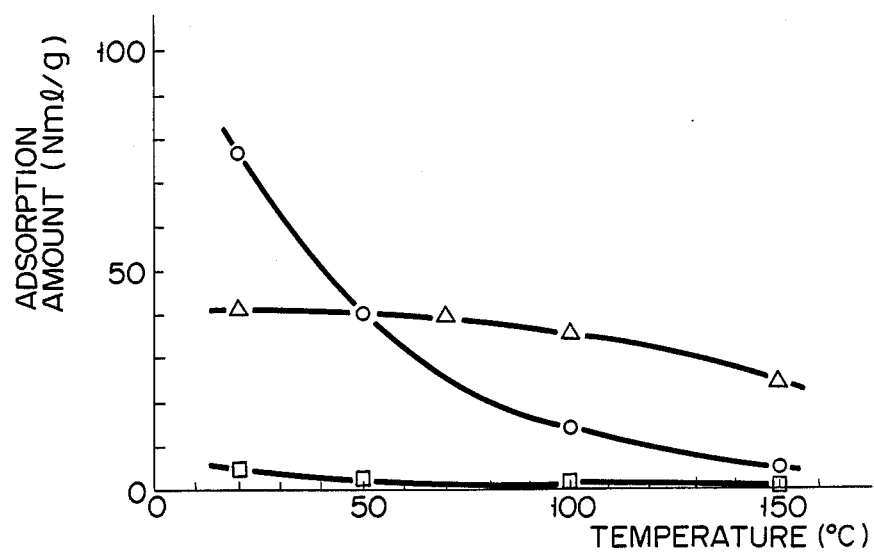
FIG. 3 is a graph showing the CO, $CO_2$, and $N_2$ adsorption amounts as a function of adsorbent temperature when an AgY adsorbent is used.

CO, $CO_2$ and $N_2$ Adsorption Characteristics of AgY Adsorbent as a Function of Temperature Ag was carried on NaY using an $AgNO_3$ solution following the same procedures as in Example 1. The obtained ion-exchange rate was 74.9%. The saturation adsorption amounts of the resultant AgY adsorbent were determined by the same measuring method as in Example 1. The obtained results are shown in FIG. 3. The saturation adsorption amounts change in a substantially similar manner to those of Cu(I)Y in FIG. 1.

EXAMPLE 3

Figure 4:
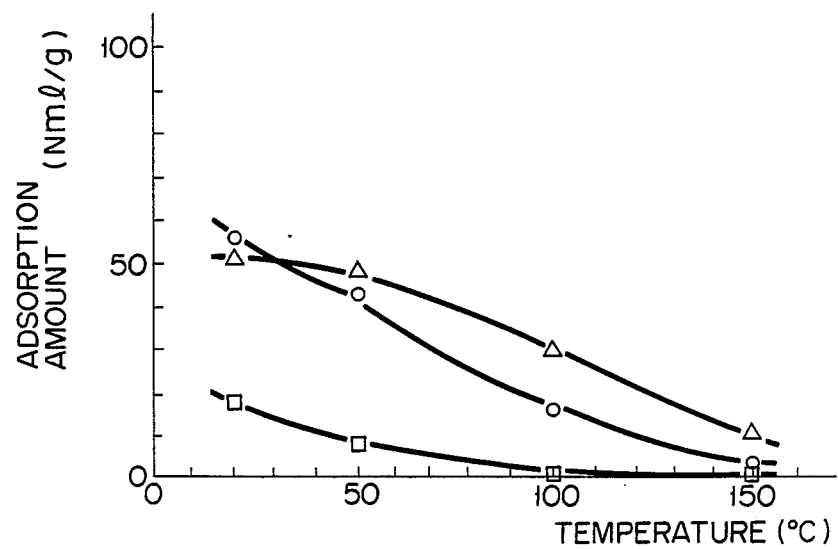
FIG. 4 is a graph showing the CO, $CO_2$ and $N_2$ adsorption amounts as a function of adsorbent temperature when an Ag mordenite adsorbent is used.

CO, $CO_2$ and $N_2$ Adsorption Characterisitcs of Ag Mordenite Absorbent as a Function of Temperature The saturation adsorption amount of an Ag mordenite adsorbent (100% ion-exchange rate) obtained by carrying Ag on Na mordenite in a similar manner to that in Example 1 was determined by the same measuring method as that in Example 1. The obtained results are shown in FIG. 4. Although the decrease rate of the $CO_2$ adsorption amount is small, at 100° C., the $CO_2$ adsorption amount is about ½ the CO adsorption amount.

EXAMPLE 4

Separation of CO by Single-Step Treatment 160 g of 2 mm$\phi \times$ 2 mm Cu(II)-Y obtained by adding 20% of a pelletizer and pelletizing were packed at a packing density of 0.45 in a pyrex glass tube having a diameter (inner diameter) of 30 mm and a length of 500 mm to provide an adsorption tower. An adsorption test was performed using this adsorption tower. A gas mixture treated was a standard gas consisting of 73.9% of CO, 9.0% of $CO_2$, 3.0% of $H_2$ and the balance of $N_2$ assuming an off-gas of an iron and steel work.

Figure 5:
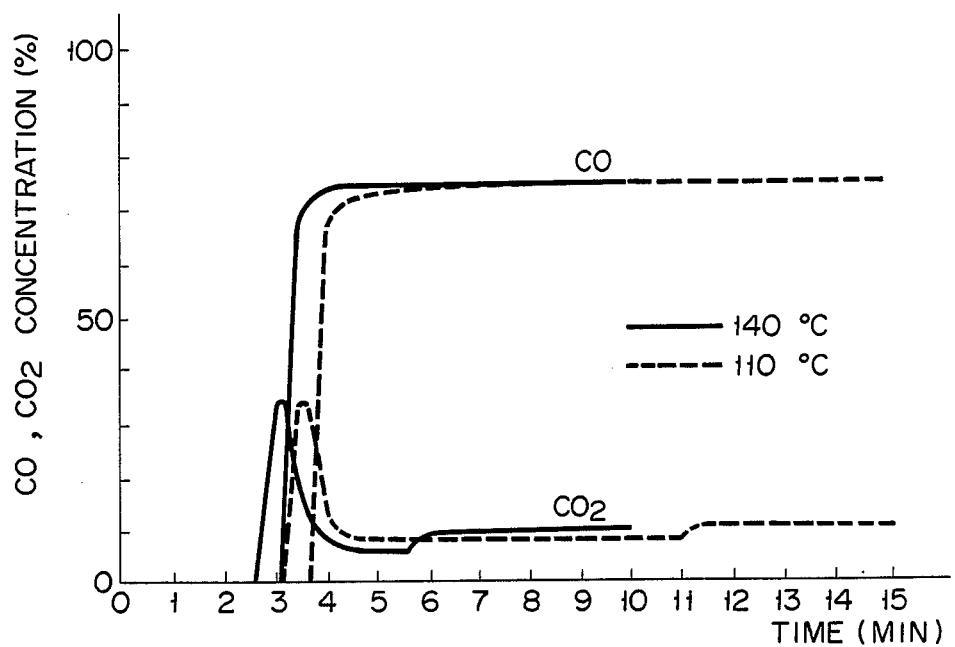
FIG. 5 is a graph showing breakthrough curves of CO and $CO_2$ in a Cu(I)-Y adsorption tower.

In order to reduce the Cu(II)-Y, pure CO gas was filled in the tower and heated at 250° C. for 1 hour. The adsorbent color changed from dark blue to white. After reducing, the CO was sufficiently desorbed and purged at 200° C. amd $10^{-3}$ mmHg for 1 hour while He was introduced and the reaction system was kept at 200° C. In order to continuously measure CO and $CO_2$ concentrations, two non-scattering infrared ray analysis apparatuses were mounted at the outlet port of the adsorption tower. The gas mixture was passed through the adsorption tower at a rate of 2 Nl/min and the CO and $CO_2$ concentrations at the outlet port were measured. The breakthrough curves when the CO/$CO_2$ adsorption was performed at 110° C. and 140° C. are shown in FIG. 5. At either temperature, $CO_2$ caused a breakthrough faster than CO indicating that the adsorbent has a higher CO adsorption capacity than a $CO_2$ adsorption capacity. It was also revealed that the breakthrough time is shortened at higher temperatures. In this manner, it was confirmed that CO can be separated from a gas mixture containing CO, $CO_2$, $H_2$ and $N_2$ by a single step.

EXAMPLE 5

Purge Characteristics of $CO_2$

Figure 6:
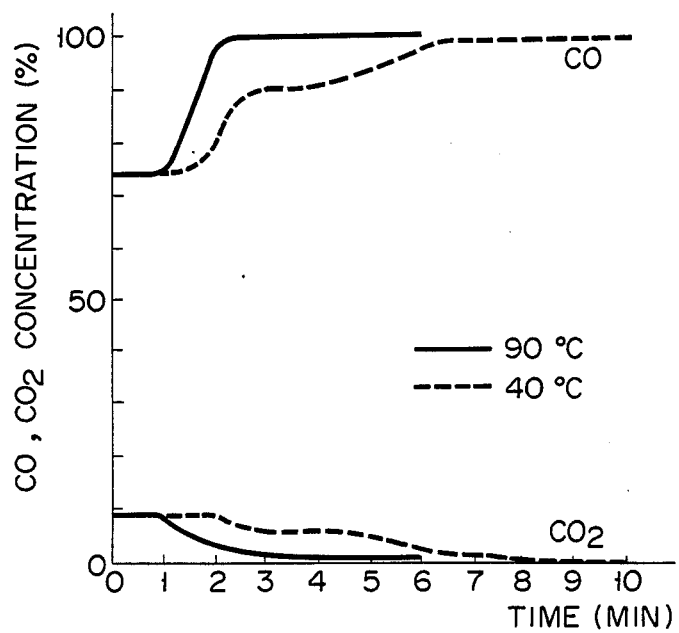
FIG. 6 is a graph showing purge curves of CO and $CO_2$ in a Cu(I)-Y adsorption tower.

After the above-mentioned gas mixture caused a breakthrough at 40° C. and 90° C. using the adsorbent and the apparatus used in Example 4, the pure CO gas was passed through the tower at a rate of 2 Nl/min to purge the tower interior and the CO and $CO_2$ concentrations at the tower outlet port were measured. The obtained results are shown in FIG. 6. At temperatures of 50° C. or lower (40° C. for the dotted curve) which is the reversal temperature of the CO and $CO_2$ saturation adsorption amounts, it takes 6 minutes to purge $CO_2$. However, at temperatures higher than this reversal temperature (90° C. for the solid curve), purging takes only 2 minutes. It can be seen from this observation that purging can be performed within a shorter period of time at higher temperatures.

EXAMPLE 6

CO, $CO_2$ and $N_2$ Adsorption Characteristics of the Adsorbent at 50° C. to 250° C.

A 0.5N solution of $CuCl_2$ was prepared. Ten grams of NaY zeolite and 50 ml of the 0.5N $CuCl_2$ solution were charged in a 100 ml round flask. After a condenser was mounted on the round flask, heat refluxing was performed at 100° C. for 2 hours. After the solution was left to stand, the supernatant was recovered by decantation. After adding another 50 ml of the 0.5N $CuCl_2$ solution, refluxing was performed in a similar manner. The refluxing was performed a total of three times. The zeolite was washed well with pure water, dried at 110° C., pulverized and baked in an electric furnace at 450° C. to provide an adsorbent. The recovered supernatant and the filtrate were mixed and the mixture was subjected to flame analysis to determine the amount of released Na and the ion-exchange rate. The ion-exchange rate was determined to be 83.5%. The obtained Cu(II)-Y zeolite was reduced in a CO atmosphere at 300° C. for 60 minutes to provide Cu(I)-Y.

Two grams of the adsorbent prepared in this manner were charged into a 20 ml sample bottle which was set in a constant-pressure type adsorption amount measuring apparatus. Dehydration was performed at 300° C. in a vacuum of $10^{-3}$ mmHg for 2 hours.

The sample bottle was placed in a silicone oil tank and was left to stand for 20 to 30 minutes. While the bottle was kept at the measuring temperature, He gas (purity: 99.9% up) was fed. The adsorption amount was measured until it reached the saturation adsorption amount to determine the dead volume. The measuring temperature was sequentially increased within a range of about 0° to 300° C. after measuring the saturation adsorption amount at each set temperature. After measurement, heating/desorption was performed at 300° C. and $10^{-3}$ mmHg for 1 hour. After the adsorbent was left to naturally cool, the adsorption amount was measured using the measuring gas following the same procedures as described above. After measuring the CO, $CO_2$ and $N_2$ adsorption amounts, the sample was measured. The CO and $CO_2$ adsorption equilibrium amounts per unit weight of the adsorbent were determined using this value.

FIG. 7 shows the obtained results. The CO and $CO_2$ adsorption equilibrium amounts are reversed at a temperature of about 50° C. as in the case of Example 1. However, within a temperature range of 50° to 150° C., the ratio $CO/CO_2$ of the CO adsorption equilibrium amount to the $CO_2$ adsorption equilibrium amount is 1.02 to 5.8. However, within a temperature range of 150° and 250° C., the ratio $CO/CO_2$ exceeds 5.8 and becomes 17.1. It can be seen that in such a temperature range the CO selective adsorption capacity of the adsorbent is improved considerably.

EXAMPLE 7

CO purity and Recovery Rate of CO gas at Adsorption Temperature of 165° C.±10° C.

The relationship between the CO purity and the recovery rate of the recovery gas as a function of adsorption temperature was examined using a PSA tester having 4 SUS 304 adsorption towers having a diameter of 2 inches and a length of 800 mm. Each tower had a mantle heater with a temperature controller, so that the tower temperature could be kept at the present temperature ±10° C.

860 g of 1/16 inch pellets (containing 20% of a pelletizer) of Cu(II)-Y zeolite prepared following the same procedures as in Example 6 were filled in each tower, and heating at 300° C. in a vacuum of 50 Torr was performed for about 5 hours. After pure CO gas was filled at a rate of about 1 Nl/min for about 2 hours, the Cu(II)-Y reduced into Cu(I)-Y.

The four-tower PSA apparatus was of a type capable of a cycle of adsorption step, purge step, desorption step and compression step as a method of recovering the adsorbed material.

Separation and purge of a gas mixture assuming a converter gas having the following composition was performed using the above apparatus.

| Gas Composition | |
|---|---|
| CO | 74.5% |
| $CO_2$ | 14.0% |
| $H_2$ | 1.0% |
| $N_2$ | 10.5% |

The setting conditions were: 165°±10° C. for the adsorption temperature, 1 kg/cm².G for the adsorption pressure, and 50 Torr for the desorption pressure. The relationship between the CO purity and the CO recovery rate of the recovered gas was determined by changing the ratio of the purge gas supply to the desorbed gas amount and the supply gas supply amount while keeping the gas flow rate within each tower constant.

Illustrating an example of the obtained results, when the supply gas was supplied at a rate of 0.76 Nl/min and the ratio of the purge amount to the desorbed amount was 0.73, the CO recovery rate was 73% and the recovered gas had a composition of:

| CO | 96.2% |
|---|---|
| $CO_2$ | 3.0% |
| $N_2$ | 0.7% |
| $H_2$ | 0.1% |

Figure 8:
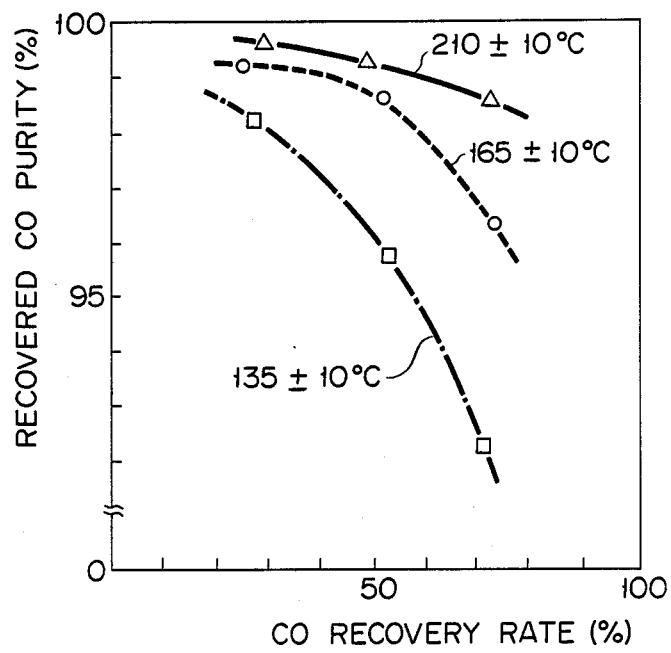
FIG. 8 is a graph showing the CO purity of recovered gas as a function of CO recovery rate using adsorbent temperature as a parameter.

The dotted curve in FIG. 8 shows the relationship between the CO purity and the CO recovery rate.

EXAMPLE 8

CO purity and Recovery Rate at Adsorption Temperature of 210°±10° C.

The relationship between the CO purity and the CO recovery rate of the CO gas was examined following the same procedures and using the same apparatus as in Example 7 except that the adsorption temperature was set at 210°±10° C.

To illustrate an example, when the supply gas was supplied at a rate of 0.70 Nl/min and the ratio of the purge amount to the desorbed amount was 0.74, the CO recovery rate was 72% and the recovered gas had a composition of:

|  |  |
|---|---|
| CO | 98.5% |
| $CO_2$ | 1.0% |
| $N_2$ | 0.4% |
| $H_2$ | 0.1% |

The solid curve in FIG. 8 shows the relationship between the CO purity and the recovery rate.

It can be seen from the above results that when the adsorption temperature is increased above that in Example 6, the CO purity for the same CO recovery rate is improved. If the CO recovery rate is decreased to about 50%, a CO purity of 99% or more is obtained.

EXAMPLE 9

CO Purity and Recovery Rate of Recovered Gas at Absorption Temperature of 135°±10° C.

The relationship between the CO purity and recovery rate was determined following the same procedures and using the same apparatus as in Example 7 except that the adsorption temperature was set at 135°±10° C.

To illustrate an example, when the supply gas was supplied at a rate of 0.72 Nl/min and the ratio of the purge amount to the desorbed amount was 0.73, the CO recovery rate was 72% and the recovered gas had a composition of:

|  |  |
|---|---|
| CO | 93.1% |
| $CO_2$ | 5.2% |
| $N_2$ | 1.4% |
| $H_2$ | 0.3% |

The alternate long and short dashed curve in FIG. 8 shows the relationship between the CO purity and the recovery rate.

It can be seen from these results that when the adsorption temperature falls below 150° C., the CO purity is decreased to 95% or less for a recovery rate of about 70%. In order to hold a CO purity of about 98%, the recovery rate must be decreased to about 30%.

EXAMPLE 10

Gas Adsorption Characteristics of Adsorbent of Present Invention and Adsorbent of Comparative Example The Y-type zeolite ($Na_2O_2O_3.4.8SiO_2.8.9H_2O$) was ion-exchanged by the following 9 types of metals to prepare 9 adsorbents. Thus, 0.5N solutions of $FeCl_2$, $Ni(NO_3)_2$, $MnCl_2$, $Co(NO_3)_2$, $CdCl_2$, $Rh(NO_3)_2$, $RuCl_3$, $CuCl_2$, and $AgNO_3$ were prepared. Ten grams of the zeolite and 50 ml of each 0.5N solution were charged in each 100 ml round flask. After a condenser was mounted on the round flask, heat refluxing at 100° C. was performed for 2 hours using a mantle heater. After the solution was left to stand, the supernatant was recovered by decantation. After adding another 50 ml of each 0.5N solution to the corresponding flask, refluxing was performed in a similar manner. The refluxing was performed a total of three times. The zeolite from each flask was washed with pure water, dried at 110° C., pulverized, and baked in an electric furnace at 450° C. for 2 hours to prepare an adsorbent. Each recovered supernatant and the corresponding filtrate were mixed and the mixture was subjected to flame analysis to determine the amount of Na released and the ion-exchange rate of each zeolite. The Cu(II)-Y zeolite was reduced in a hydrogen atmosphere at 180° C. for 30 minutes to prepare Cu(I)-Y. The measured ion-exchange rates are shown in Table 2 below.

Figure 9:
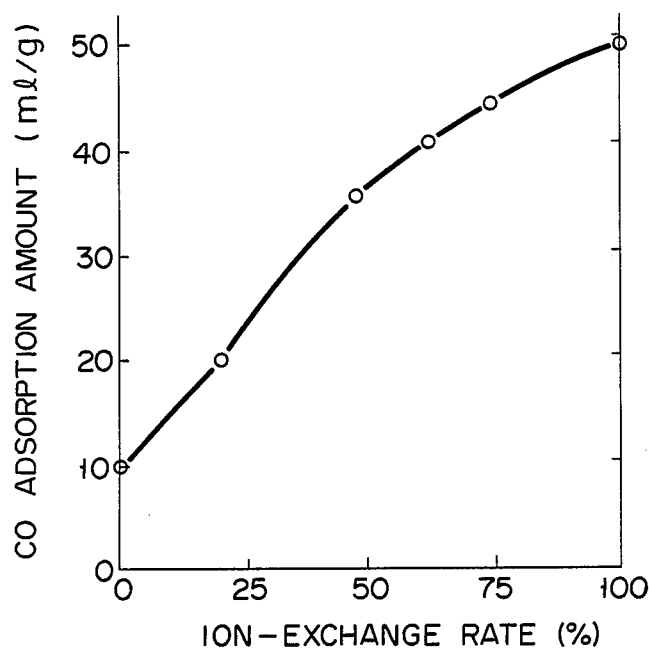
FIG. 9 is a graph showing the CO adsorption amount as a function of ion-exchange rate of zeolite.

After the adsorbents prepared in this manner were completely dehydrated at 150° C. and $10^{-3}$ mmHg for 1 hour, the $N_2$, CO, $CO_2$, $O_2$ and $H_2$ adsorption amounts were measured at 20° C. at ambient pressure. In each adsorbent, the ion-exchange rate and the gas adsorption amount held a substantially linear relationship as can be seen from the case of AgY shown in FIG. 9. Therefore, all gas adsorption amounts are calculated to be those at an ion-exchange rate of 50%.

The Y-type zeolites having Ni, Mn, Rh, Cu(I) and Ag thereon shown in Table 2 have higher CO and $N_2$ adsorption amounts as compared to those of NaY not carrying a transition metal in Table 3 and those carrying other metals in Table 4.

TABLE 2

| Metal ion-exchanged Y-type zeolite | Gas adsorption amount N ml/g | | | | | vCO/vN$_2$ | Ion exchange rate % |
|---|---|---|---|---|---|---|---|
| | $N_2$ | CO | $CO_2$ | $O_2$ | $H_2$ | | |
| NiY | 5.6 | 16.9 | 111.4 | 2.2 | 0.3 | 3.02 | 51.2 |
| MnY | 4.9 | 12.4 | 112.1 | 3.3 | 0.3 | 2.53 | 41.9 |
| RhY | 3.3 | 12.5 | 82.3 | 2.1 | 23.1 | 3.79 | 59.2 |
| Cu(II)Y | 5.1 | 11.5 | 91.6 | 2.5 | 1.2 | 2.25 | 82.7 |
| Cu(I)Y | 5.0 | 33.1 | 96.4 | 3.3 | 1.8 | 6.62 | 82.7 |
| AgY | 6.1 | 37.7 | 112.0 | 3.2 | 9.5 | 6.18 | 74.9 |

TABLE 3

| Y-Type zeolite | Gas adsorption amount N ml/g | | | | | vCO/vN$_2$ |
|---|---|---|---|---|---|---|
| | $N_2$ | CO | $CO_2$ | $O_2$ | $H_2$ | |
| NaY | 5.8 | 14.2 | 117.0 | 2.9 | 0.9 | 2.45 |

TABLE 4

| Metal ion-exchanged zeolite | Gas adsorption amount N ml/g | | | | | vCO/vN$_2$ | Ion exchange rate % |
|---|---|---|---|---|---|---|---|
| | $N_2$ | CO | $CO_2$ | $O_2$ | $H_2$ | | |
| FeY | 3.9 | 8.2 | 82.7 | 1.1 | 0 | 2.10 | 42.0 |
| CoY | 5.1 | 11.8 | 99.8 | 2.6 | 0.3 | 2.31 | 49.9 |
| CdY | 5.8 | 12.9 | 101.7 | 3.5 | 0.6 | 2.19 | 39.2 |
| RuY | 3.3 | 7.2 | 71.6 | 2.0 | 4.8 | 2.18 | 71.0 |

EXAMPLE 11

Gas Adsorption Characteristics of Adsorbent of Present Invention and Adsorbent of Comparative Example The adsorption amounts for the three adsorbents prepared by silver ion ion-exchange of the rolloing three zeolites were measured. The ion-exchange and measurement of the adsorption amounts were performed following the same procedures as in Example 10.

| A-type zeolite: | $Na_2O \cdot Al_2O_3 \cdot 2SiO_2 \cdot 4.5H_2O$ |
|---|---|
| Mordenite: | $Na_2O \cdot Al_2O_3 \cdot 9\text{-}10SiO_2 \cdot 6H_2O$ |
| X-type zeolite: | $Na_2O \cdot Al_2O_3 \cdot 2.5SiO_2 \cdot 6H_2O$ |

The zeolites carrying Ag in Table 5 have higher CO and $N_2$ absorption amounts than the zeolites not carrying any transition metal in Table 6.

TABLE 5

| Metal ion-exchanged zeolite | Gas adsorption amount N ml/g | | | | | vCO/ vN$_2$ | Ion exchange rate % |
|---|---|---|---|---|---|---|---|
| | $N_2$ | CO | $CO_2$ | $O_2$ | $H_2$ | | |
| AgA | 7.1 | 34.1 | 75.6 | 4.3 | 7.6 | 4.80 | 36.8 |
| AgX | 4.9 | 45.4 | 103.8 | 3.3 | 9.7 | 9.27 | 39.8 |
| Ag mordenite | 17.7 | 41.4 | 63.0 | 6.8 | 7.9 | 2.34 | 100.0 |

TABLE 6

| Zeolite | Gas adsorption amount N ml/g | | | | | vCO/vN$_2$ |
|---|---|---|---|---|---|---|
| | $N_2$ | CO | $CO_2$ | $O_2$ | $H_2$ | |
| 4A(NaA) | 12.5 | 31.5 | 93.3 | 6.7 | 7.2 | 2.52 |
| 13X(NaX) | 6.1 | 16.6 | 111.3 | 5.9 | 2.4 | 2.72 |
| Na mordenite | 5.8 | 14.2 | 117.0 | 2.9 | 0.9 | 1.76 |

EXAMPLE 12

Confirmation of Temperature Increase by Compression

Figure 15:
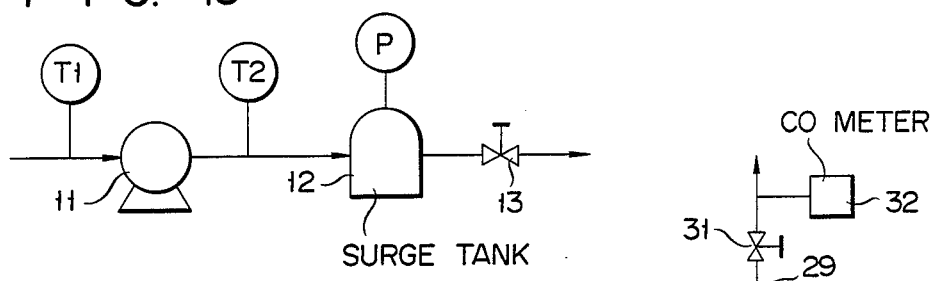
FIG. 15 is a diagram showing a testing apparatus for testing the relationship between the pressure and gas temperature when a gas is adiabatically compressed.

Pressure and temperature after compression by a diaphragm compressor 11 were measured by a tester shown in FIG. 15. The sample gas was air, and gas temperature before compression was the ambient temperature (about 25° C.). The compressor 11 had a maximum flow rate of 25 Nl/min and a maximum boosting pressure of 12 kg/cm$^2$.G, and pressure after boosting was adjusted by means of a needle valve 13. Piping connected to the outlet port of the compressor and a surge tank 12 were mounted with heat-insulators, and as stable temperature obtained with a thermometer T2 was obtained as a measurement. The obtained results are shown below. The calculated value at each pressure is also shown. The actual apparatus was small and heat loss was large. When the actual measurements are compared with the calculated values obtained assuming zero heat loss, although the actual measurements have small temperature increase rates, they do exhibit temperature increase with an increase in pressure.

TABLE 7

| Test No. | Pressure kg/cm$^2$ · G | Temperature 1 °C. | Temperature 2 °C. | Calculated value °C. |
|---|---|---|---|---|
| 1 | 1 | 23 | 68 | 88 |
| 2 | 2 | 25 | 102 | 135 |
| 3 | 3 | 23 | 121 | 167 |
| 4 | 5 | 24 | 153 | 223 |
| 5 | 7 | 24 | 173 | 265 |
| 6 | 9 | 25 | 195 | 303 |

EXAMPLE 13

Dynamic Adsorption Characteristics of Adsorbent

Since the temperature increase by compression was confirmed in Example 12, the dynamic adsorption characteristics at the temperature corresponding to each pressure in FIG. 10 were measured.

Assuming a converter gas, the supply gas supplied had the following composition as a standard gas and was supplied from a supply source 21 (about 80 kg/cm$^2$.G).

| CO | 73.7% |
|---|---|
| $N_2$ | 14.24% |
| $H_2$ | 3.03% |
| $CO_2$ | 9.03% |

Figure 16:
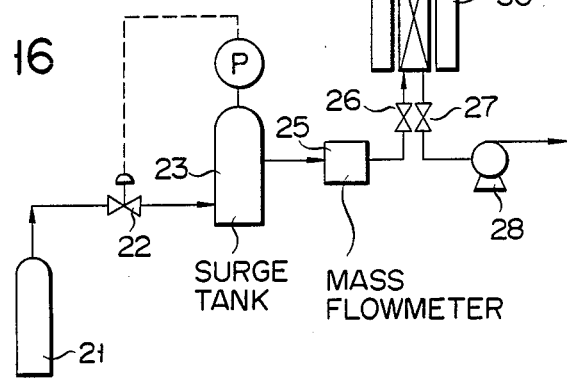
FIG. 16 is a diagram showing a testing apparatus for testing dynamic adsorption characteristics of an adsorbent.

In a tester shown in FIG. 16, in order to keep the pressure in the surge tank 23 at 3 kg/cm$^2$.G with a closed valve 27, the standard gas was evacuated by a pressure control valve 22 and supplied into an adsorption tower having an inner diameter of 20 mm and a height of 1,000 mm through a mass flowmeter 25. The gas flow rate supplied to the mass flowmeter was set at 1.5 Nl/min by a needle valve 31 mounted at the outlet port of the adsorption tower. The adsorbent used carried zeolite Cu(I) having a silica/alumina ratio of 10 or less. When the CO concentration at the outlet port of the adsorption tower measured by a CO meter 32 reached the original concentration, the valves 26 and 31 were closed and the valve 27 was opened. The adsorbed gas was desorbed by a vacuum pump 28 at about 30 Torr, and the composition of the recovered gas was analysed by gas chromatography.

In Examples, it was demonstrated that even if heat insulators were used, heat loss was considerable. For this reason, the temperature of the tower interior was kept by an external heater at about 200° C. which corresponds to a pressure of 3 kg/cm$^2$.G.

As a result, the recovered gas had the following composition:

| CO | 90.6% |
|---|---|
| $N_2$ | 6.0% |
| $H_2$ | 0.1% |
| $CO_2$ | 3.3% |

It can be seen from these results that CO separation can be performed with a single-step treatment by the method of the present invention. In practice, since a purge step is performed, a CO purity of about 99% can be obtained.

What is claimed is:

1. A method of recovering carbon monoxide in a gas mixture containing at least carbon monoxide and carbon dioxide, comprising:
    selectively adsorbing carbon monoxide in the gas mixture on a Cu(I) adsorbent supported on a zeolite carrier selected from the group consisting of Y-type zeolite and mordenite-type zeolite and having a silica/alumina ratio of not more than 10, an effective pore diameter of not less than 0.38 nm (3.8A) and capable of adsorbing carbon monoxide, the adsorption temperature being 80° C. to 250° C.;
    separating the adsorbed carbon monoxide; and
    recovering the separated carbon monoxide.
2. The method of claim 1, wherein the adsorption temperature is from 80° C. to 150° C.
3. The method of claim 1, wherein the adsorption temperature is from 150° C. to 250° C.
4. The method of claim 3, wherein the zeolite carrier is a Y-type zeolite.

5. The method of claim 4, wherein the gas mixture contains at least 60% of carbon monoxide.

6. The method of claim 1, wherein the zeolite carrier is a Y-type zeolite.

7. The method of claim 1, wherein the gas mixture contains at least 20% of carbon monoxide.

8. The method of claim 1, wherein the gas mixture is converter gas.

9. The method of claim 1, wherein the gas mixture contains at least 60% of carbon monoxide.

10. The method of claim 1 wherein the zeolite carrier is a mordenite-type zeolite.

11. The method of claim 1, wherein the gas mixture is adiabatically compressed at a pressure of 0.5 kg/cm$^2$.G to 7 kg/cm$^2$.G by a compressor to boost a gas temperature to the adsorption temperature of 80° C. to 250° C., and carbon monoxide in the gas mixture is adsorbed with the adsorbent and removed.

* * * * *